United States Patent
Fistler et al.

(10) Patent No.: US 11,992,899 B2
(45) Date of Patent: May 28, 2024

(54) MITIGATION OF THE EFFECTS OF ALUMINUM FROM AlSI COATED BORON STEELS DURING LASER WELDING OF TAILOR WELDED BLANKS BY ADDITIVE MANUFACTURING

(71) Applicants: Mark R Fistler, Armada, MI (US); Robert B Ruokolainen, Northville, MI (US)

(72) Inventors: Mark R Fistler, Armada, MI (US); Robert B Ruokolainen, Northville, MI (US)

(73) Assignee: FCA US LLC, Auburn Hills, MI (US)

( * ) Notice: Subject to any disclaimer, the term of this patent is extended or adjusted under 35 U.S.C. 154(b) by 77 days.

(21) Appl. No.: 17/173,692

(22) Filed: Feb. 11, 2021

(65) Prior Publication Data
US 2021/0252641 A1 Aug. 19, 2021

Related U.S. Application Data (60) Provisional application No. 62/977,538, filed on Feb. 17, 2020.

(51) Int. Cl.
| | |
|---|---|
| *B23K 26/342* | (2014.01) |
| *B22F 10/28* | (2021.01) |
| *B22F 10/64* | (2021.01) |
| *B23K 26/26* | (2014.01) |
| *B23K 26/354* | (2014.01) |

(Continued)

(52) U.S. Cl.
CPC ............ *B23K 26/342* (2015.10); *B22F 10/28* (2021.01); *B22F 10/64* (2021.01); *B23K 26/26* (2013.01); *B23K 26/354* (2015.10); *B23K 26/60* (2015.10); *B33Y 10/00* (2014.12); *B33Y 40/20* (2020.01);
(Continued)

(58) Field of Classification Search
CPC ...... B23K 26/342; B23K 26/60; B23K 26/26; B22F 10/28
See application file for complete search history.

(56) References Cited

U.S. PATENT DOCUMENTS

| | | |
|---|---|---|
| 10,052,720 B2 | 8/2018 | Gu et al. |
| 10,052,721 B2 | 8/2018 | Gu et al. |

(Continued)

FOREIGN PATENT DOCUMENTS

| | | |
|---|---|---|
| WO | WO-2015/071621 A1 | 5/2015 |
| WO | WO-2020/000083 A1 | 1/2020 |

*Primary Examiner* — Nathaniel E Wiehe
*Assistant Examiner* — Dilnessa B Belay
(74) *Attorney, Agent, or Firm* — Jeremy J. Klobucar (57) ABSTRACT

The present disclosure provides a method that includes providing a first blank including an upper major surface, a lower major surface, and a plurality of side surfaces that connect the lower major surface to the upper major surface. The upper and lower major surfaces each includes a coating that includes aluminum, and the side surfaces are devoid of the coating. The method also includes forming an additive layer on at least one of the side surfaces that is devoid of the coating, and includes laser welding the first blank including the additive layer to a second blank, wherein a thickness of the additive layer is such that during the laser welding, the laser irradiates a material of the additive layer without irradiating the coating to form a weld pool that includes the material of the additive layer and does not include the aluminum of the coating.

16 Claims, 6 Drawing Sheets

(51) Int. Cl.
  *B23K 26/60* (2014.01)
  *B33Y 10/00* (2015.01)
  *B33Y 40/20* (2020.01)
  *B33Y 80/00* (2015.01)

(52) U.S. Cl.
  CPC ......... *B33Y 80/00* (2014.12); *B22F 2301/052* (2013.01); *B22F 2301/35* (2013.01)

(56) References Cited

U.S. PATENT DOCUMENTS

2017/0173734 A1* 6/2017 Evangelista ........... B23K 26/60
2017/0314595 A1* 11/2017 Tokunaga ............ B23K 26/211

* cited by examiner

MITIGATION OF THE EFFECTS OF ALUMINUM FROM AlSI COATED BORON STEELS DURING LASER WELDING OF TAILOR WELDED BLANKS BY ADDITIVE MANUFACTURING

CROSS-REFERENCE TO RELATED APPLICATIONS

This application claims priority to U.S. Provisional Patent Application No. 62/977,538 filed on Feb. 17, 2020, the entire disclosure of which is incorporated herein by reference.

FIELD

The present disclosure relates to mitigating the effects of aluminum from AlSi-coated boron steels during laser welding of tailor welded blanks by additive manufacturing.

BACKGROUND

Hot-pressed aluminum (Al) and silicon (Si) coated boron steel is used in the automotive industry where high tensile strength is of great importance, such as, for example, in the chassis or various panels of the vehicle body where deformation has to be kept to a minimum in the event of a collision. In this regard, after hot-pressing, AlSi-coated boron steel exhibits excellent properties such as high tensile strength, minimal spring-back, and also good protection against corrosion.

To form an automotive part from AlSi-coated boron steel, it is typical to weld a pair of blanks together using a laser. Laser welded blanks are an innovative way for automakers to reduce the weight of the vehicle while improving safety at the same time. Laser welded blanks are also used to provide economy of blank material usage, which reduces cost. Blanks formed of different grades of steel may be combined together into a single part to ensure that the proper grade of steel is in the correct location for safety and performance. Alternatively, blanks formed of the same grade of steel having different thicknesses may be combined together into a single part.

When welding a pair of blanks together that are each formed of AlSi-coated boron steel, the Al and Si of the coating may become distributed in the molten weld pool. The existence of Al in too great of an amount in the molten weld pool, however, can impede the complete and consistent thermal transformation of the weld into an ultra-high strength material during thermal-hardening. In such an instance, the weld may be weaker than the materials of the blanks, which is undesirable.

SUMMARY

According to a first aspect of present disclosure, there is provided a method that includes providing a first blank including an upper major surface, a lower major surface, and a plurality of side surfaces that connect the lower major surface to the upper major surface. The upper and lower major surfaces each includes a coating that includes aluminum, and the side surfaces are devoid of the coating. The method also includes forming an additive layer on at least one of the side surfaces that is devoid of the coating, and includes laser welding the first blank including the additive layer to a second blank, wherein a thickness of the additive layer is such that during the laser welding, the laser irradiates a material of the additive layer without irradiating the coating to form a weld pool that includes the material of the additive layer and does not include the aluminum of the coating.

According to the first aspect, the material of the additive layer may be the same or different as a material of the first blank.

According to the first aspect, the material of the first blank may be boron steel.

According to the first aspect, the second blank includes another additive layer.

According to the first aspect, the method may also include conducting a thermal-hardening process to the first and second blanks joined by the laser welding.

According to the first aspect, the method may also include shaping the first and second blank joined by the laser welding at the same time as the conducting the thermal-hardening process.

According to the first aspect, the thickness of the additive layer may be up to 3 mm.

According to the first aspect, the additive layer may be formed by powder laser deposition process.

According to the first aspect, a powder used in the laser deposition process may be formed of a material that is the same as a material that forms the first blank.

According to the first aspect, a powder used in the laser deposition process may be formed of a material that is different from a material that forms the first blank.

According to the first aspect, the coating that includes aluminum is an AlSi alloy.

According to the first aspect, a material of the first blank may be the same as a material of the second blank.

According to the first aspect, a thickness of the first blank is the same as a thickness of the second blank.

According to the first aspect, a thickness of the first blank is different from a thickness of the second blank.

According to a second aspect of the present disclosure, there is provided a method that includes providing a first boron steel blank including an upper major surface, a lower major surface, and a plurality of side surfaces that connect the lower major surface to the upper major surface. The upper and lower major surfaces each include a coating that includes aluminum, and the side surfaces are devoid of the coating. The method also includes forming an additive layer on at least one of the side surfaces that is devoid of the coating using a powder laser deposition process, where the additive layer is formed of a material that is the same or different from that of the first boron steel blank; laser welding the first boron steel blank including the additive layer to a second blank; and thermal-hardening the welded first boron steel blank and the second blank; wherein a thickness of the additive layer is such that during the laser welding, the laser irradiates a material of the additive layer without irradiating the coating to form a weld pool that includes the material of the additive layer and does not include the aluminum of the coating.

According to the second aspect, the second blank may include another additive layer.

According to the second aspect, a material of the second blank may be the same as the first boron steel blank.

According to the second aspect, a thickness of the first boron steel blank may be the same as a thickness of the second blank.

According to the second aspect, a thickness of the first boron steel blank may be different from a thickness of the second blank.

According to the second aspect, the method may also include shaping the first boron steel blank and the second blank joined by the laser welding at the same time as the thermal-hardening process.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
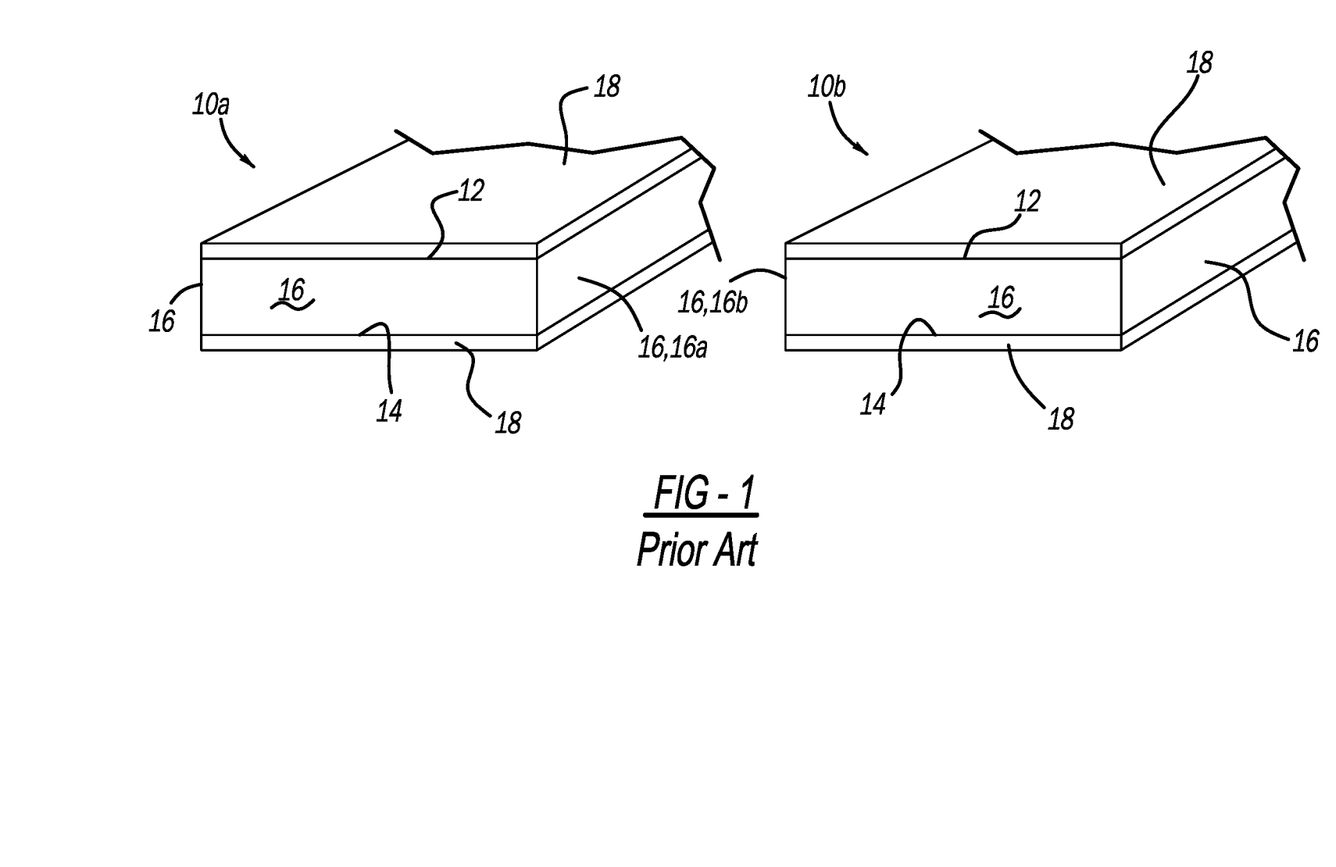
FIG. 1 is a perspective view of a pair of blanks to be laser welded together according to a conventional laser welding process, where each of the blanks include an anti-corrosion coating on major surfaces thereof.

FIG. 1 illustrates a pair of blanks 10a and 10b that are each formed of a metal material such as boron steel. Blanks 10a and 10b each include an upper major surface 12 and a lower major surface 14 that are connected by a plurality of side surfaces 16. In the illustrated embodiment, each of the major surfaces 12 and 14 are coated with a coating 18 of material that resists corrosion. For example, coating 18 may be formed of an alloy of Al and Si. While blanks 10a and 10b are described as being formed of boron steel, it should be understood that other types of steel or other alloys can be used without departing from the scope of the present disclosure. For example, blanks 10a and 10b may be formed of boron-manganese alloyed steel where the upper and lower major surfaces 12 and 14 each include coating 18 that includes Al and Si, where the amount of the coating 18 applied to each of the upper and lower major surfaces 12 and 14 is in the range of 30 to 100 g/m². Moreover, it should be understood that blank 10a may be formed of a material that is different from the material of blank 10b, that blanks 10a and 10b do not necessarily have the same thickness, and that only one of the blanks (e.g., 10a) includes coating 18.

Figure 2:
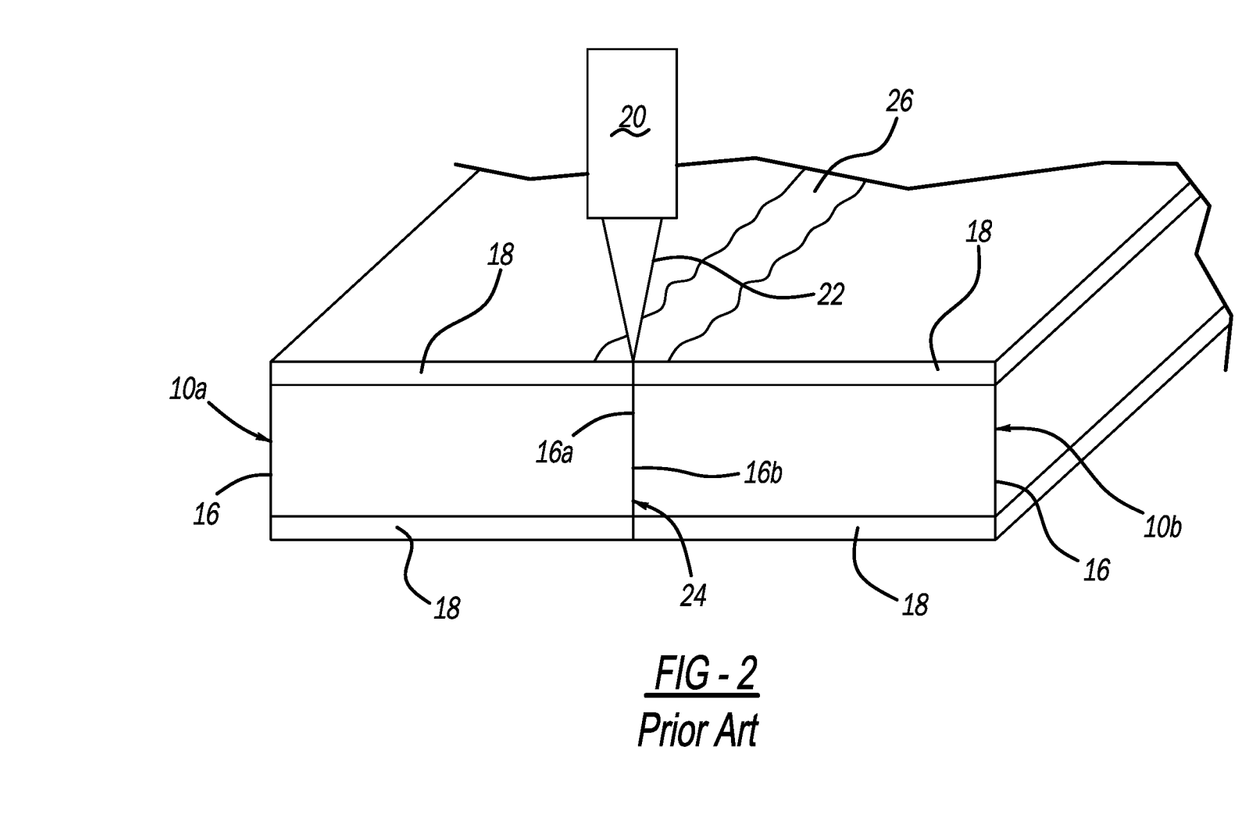
FIG. 2 is a perspective view of the conventional laser welding process of joining the blanks illustrated in FIG. 1 together.

Now turning to FIG. 2, when blank 10a is to be welded to blank 10b, a side surface 16a of blank 10a is abutted against a side surface 16b of blank 10b. Such a configuration is known as a butt-welding configuration. The abutting blanks 10a and 10b may then be fed through a laser-welding apparatus where a laser 20 applies radiation 22 to the seam or interface 24 between blanks 10a and 10b. At this time, the material of the blanks 10a and 10b melts to form a weld pool 26 between the blanks 10a and 10b that subsequently cools to secure the blanks 10a and 10b together. In addition, the coating 18 may vaporize and/or melt and become distributed in the weld pool 26. As noted above, the existence of Al in the weld pool 26 is undesirable because these materials can impede the complete and consistent thermal transformation of the weld pool 26 into an ultra-high strength material during thermal-hardening, which occurs after welding of blanks 10a and 10b together. This, in turn, can result in the weld being weaker than the materials of the blanks 10a and 10b after thermal-hardening, which is undesirable.

More specifically, blanks 10a and 10b before thermal-hardening are typically formed of a material (e.g., boron steel) where the alloy has an austenite crystal phase. While the austenite crystal phase has great strength, the strength of the alloy can be increased by subjecting the blanks 10a and 10b to a thermal-hardening process where blanks 10a and 10b are heated to temperatures that are about or in excess of 900 degrees C. and then quickly quenched by cooling the material at a very high rate. During the thermal-hardening process, the alloy of the blanks 10a and 10b transitions, at least to some extent, from the austenite crystal phase to a martensite crystal phase, which provides the blanks 10a and 10b with ultra-high strength (e.g., 1300 MPA+). This ultra-high strength is desirable from the standpoint that a thickness of the blanks 10a and 10b that are used to subsequently form automotive panels or structural supports can be reduced, which results in a weight-reduction without sacrificing strength. The existence of Al in the cooled weld pool 26, however, prevents or inhibits this transition of the weld pool 26 from the austenite crystal phase to the martensite crystal phase during thermal-hardening, which reduces the strength of the weld pool 26 in comparison to the blanks 10a and 10b.

Figure 3:
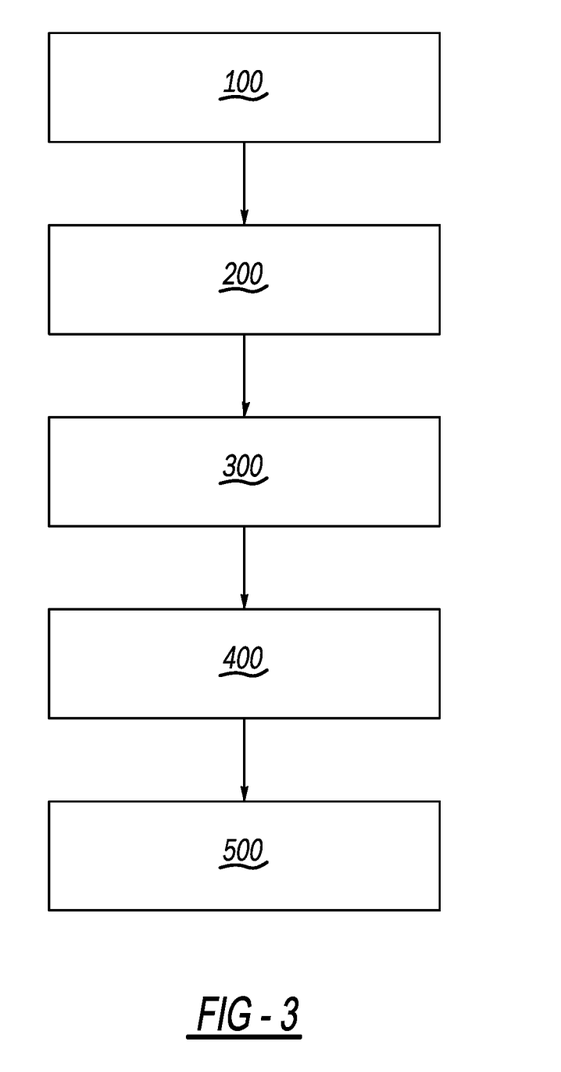
FIG. 3 illustrates various steps of a method according to a principle of the present disclosure.

With the above in mind, the present disclosure provides a method of preventing, or at least substantially minimizing, the existence of Al in the weld pool 26 during laser welding of a pair of blanks 10a and 10b that include the AlSi coating layer 18. In this regard, as best shown in FIG. 3, the method of the present disclosure includes providing a pair of blanks 10a and 10b to be welded together (block 100), modifying at least one of the blanks 10a and 10b to include an additive layer 28 on at least one side surface 16a, 16b of the blanks 10a and/or 10b that will form the interface 24 between blanks 10a and 10b (block 200), laser welding the blanks 10a and 10b at the interface 24 including the additive layer(s) 28 (block 300), thermal-hardening the welded blanks 10a and 10b (block 400), and shaping the welded blanks 10a and 10b into the desired final part (block 500).

While the steps of thermal-hardening the welded blanks 10a and 10b (block 400) and the step of shaping the welded blanks 10a and 10b are shown as separate steps, it should be understood that these steps can be combined into a single step where the thermal-hardening that transforms the microstructure of the blanks 10a and 10b and weld pool 26 may take place by heating the welded blanks 10a and 10b, and then placing the heated welded blanks 10a and 10b in a die that is configured to simultaneously shape and quench the heated welded blanks 10a and 10b. Alternatively, the thermal-hardening may occur before or after the shaping of the welded blanks 10a and 10b.

Figure 4:
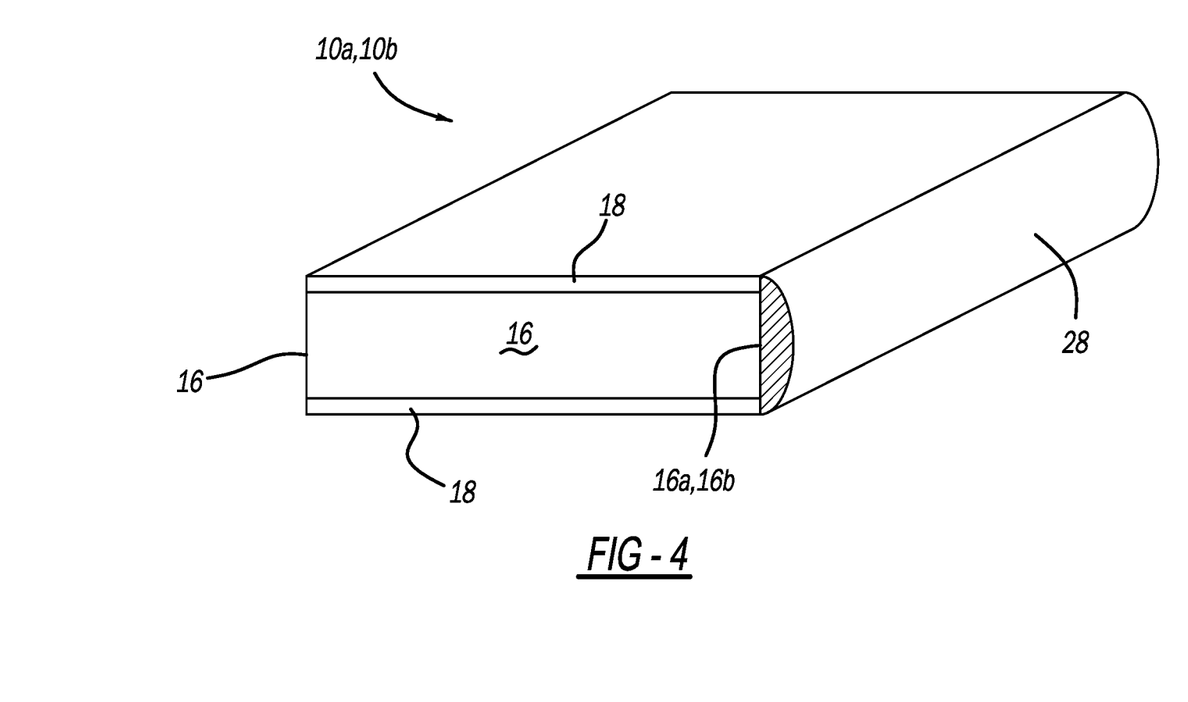
FIG. 4 is a perspective view of a blank that has been subjected to forming an additive layer on a side surface thereof according to a principle of the present disclosure.
Figure 5:
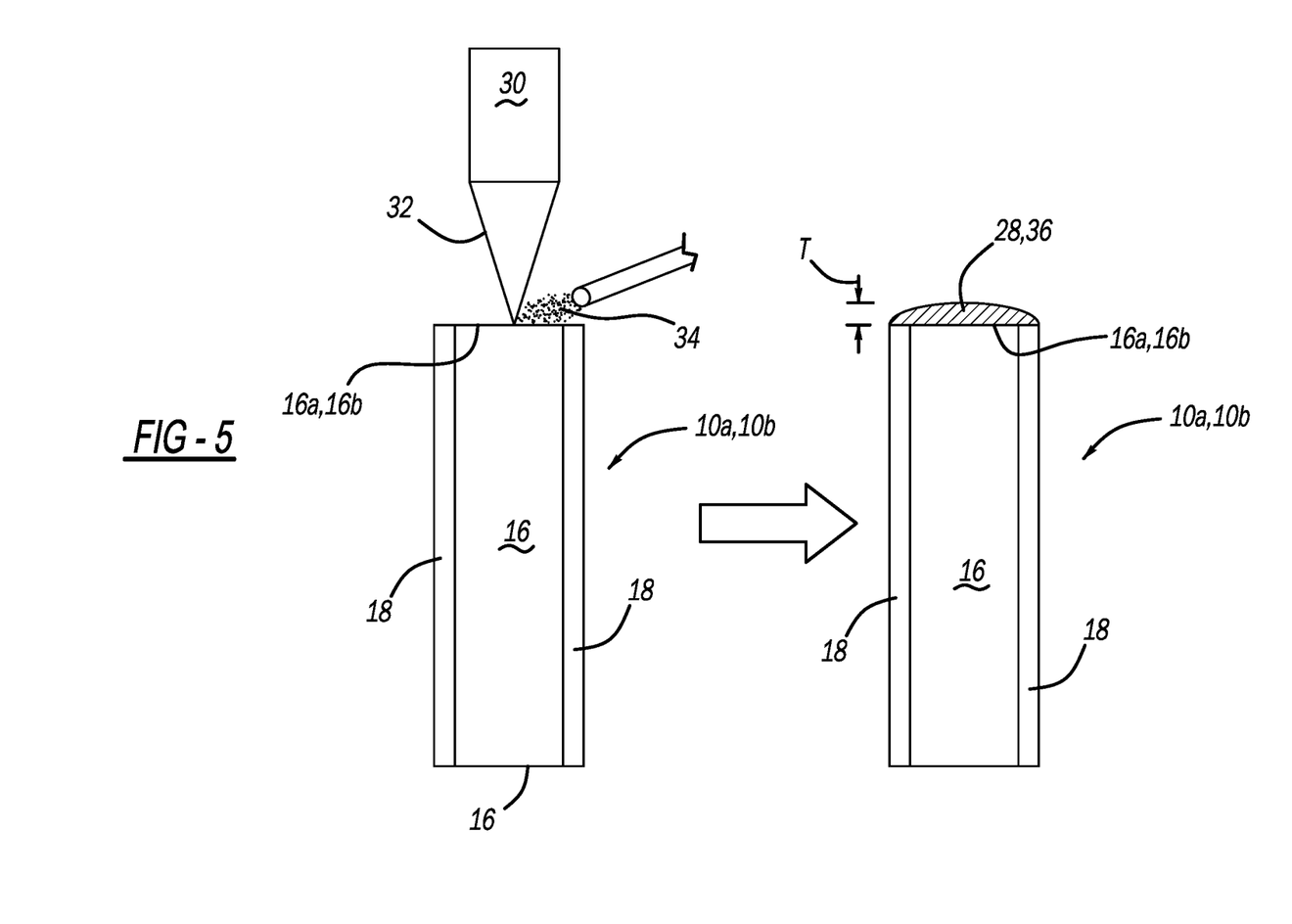
FIG. 5 is a perspective view of a powder laser deposition process of forming the additive layer illustrated in FIG. 4 on the side surface thereof according to a principle of the present disclosure.
Figure 6:
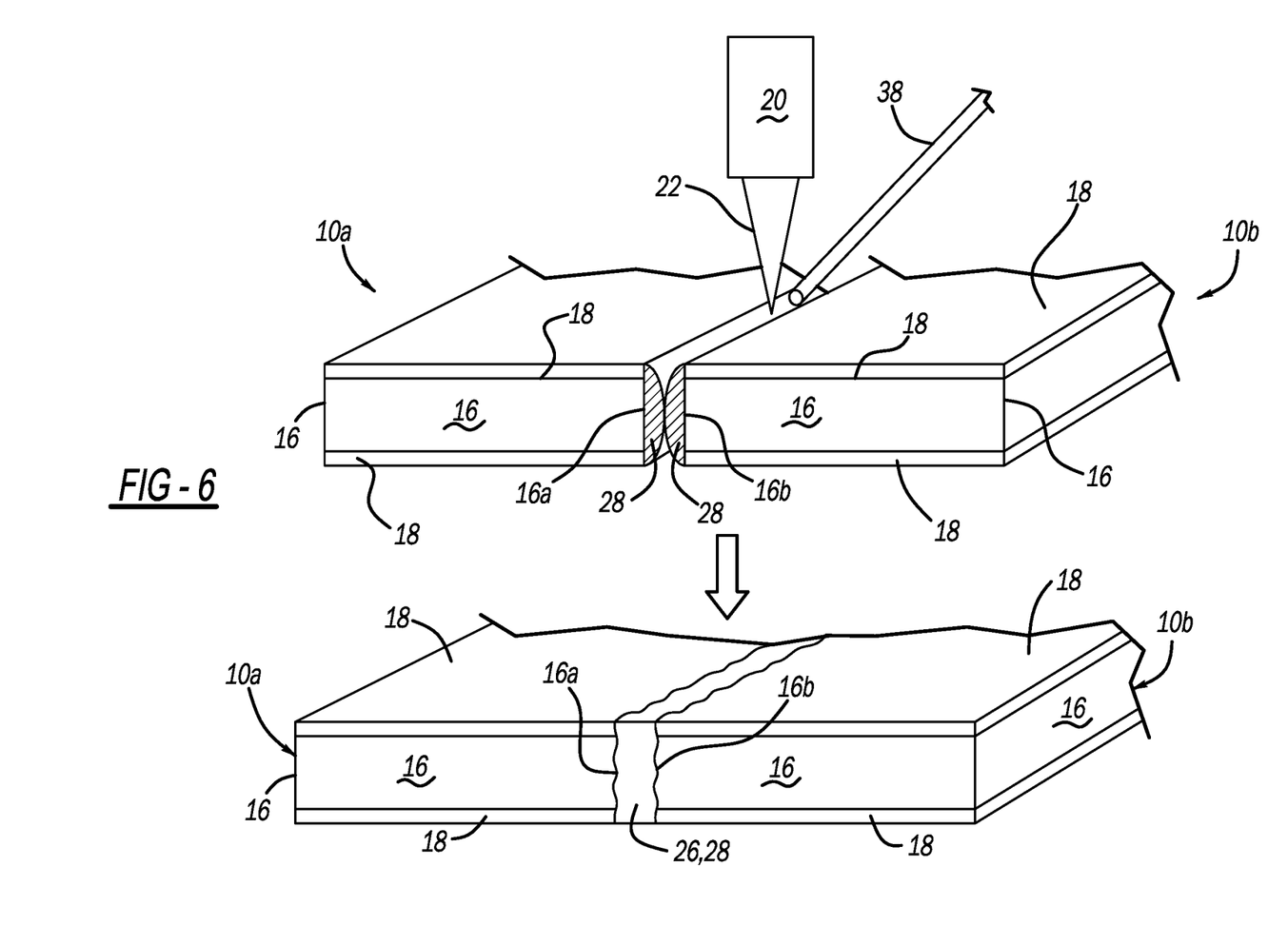
FIG. 6 is a perspective view of a laser welding process of joining blanks that each include an additive layer together according to a principle of the present disclosure.

As best shown in FIGS. 4 to 6, the additive layer 28 is applied to the at least one side surface 16a, 16b by an additive process that may include, but is not limited to, a powder laser deposition process. Powder laser deposition is a process in which metal powder is injected into the focused beam of a high-power laser 30 under tightly controlled atmospheric conditions. Specifically, as the focused laser beam 32 melts the surface of the target material (i.e., side surface 16a, 16b of either blank 10a or 10b) and generates a small molten pool of the base blank material, the metal powder 34 is simultaneously delivered to the location at which the laser beam 32 is melting the target material such that the metal powder 34 is also melted and absorbed into the melt pool to generate the additive layer 28. Preferably, the metal powder 34 that forms the additive layer 28 is formed of the same base material that forms blanks 10a and/or 10b (i.e., boron steel). It should be understood, however, that other metal material or alloys can be used so long as the resultant weld strength between blanks 10a and 10b is maintained. Specifically, other metal materials or alloys can be used so long as the weld can be increased in strength during thermal-hardening, and so long as similar ductility is maintained (i.e., 5% elongation). An example material that is different from that of the blanks 10a and/or 10b is a corrosion-resistant nickel chromium material such as Inconel® 718.

An example laser that can be used in both the powder laser deposition process and the laser welding process is a Trumpf Trulaser Cell 3000 having a TruDiode 4006 laser, which is a type of diode laser. The laser may emit a beam having a wavelength of 920 to 1040 nm at a power that ranges between 80 to 4000 W with a 50 mrad beam divergence. The operating temperature of such a laser is preferably in the range of 10 to 50 degrees C. It should be understood, however, that different lasers may be used for each of the powder laser deposition process and the laser welding process so long as the laser is sufficient to melt a material of the blanks 10a and 10b. For example, other types of lasers include a gas laser such as $CO_2$ laser, a solid-state laser such as a YAG laser, and a fiber laser such as a Yb fiber laser.

By applying the additive layer 28 that is formed of the same or similar base material as the blank 10a and/or 10b to the side surface 16 of the blank 10a and/or 10b, the side surface 16 of the blank 10a and/or 10b will include a surface that is devoid of the AlSi layer 18. In this regard, the additive layer 28 will provide blank 10a and/or 10b with a section 36 that is spaced apart from the AlSi layer 18 formed on blank 10a and/or 10b. Thus, when blanks 10a and 10b are subsequently welded together (FIG. 6), the radiation 22 of laser 20 can be focused at section 36 that is devoid of the AlSi layer 18, which results in weld pool 26 between blanks 10a and 10b that is devoid of Al and/or Si. Accordingly, when the weld pool 26 cools to secure blanks 10a and 10b together, and blanks 10a and 10b are subsequently thermal-hardened, the complete and consistent transformation of the weld into an ultra-high strength material can be achieved. While complete absence of Al in weld pool 26 is ideal, it should be understood that an amount of diluted Al content may support sufficient thermal transformation of the weld during hardening.

The amount of metal powder that is delivered to the melt pool to form the additive layer 28 can be controlled to adjust the thickness T of the additive layer 28 (FIG. 5). For example, the thickness T of the additive layer 28 can be up to 3 millimeters, which provides a sufficient distance away from AlSi coating 18 such that when laser 20 is impinged against additive layer 28, the AlSi coating 18 will not become distributed into the weld pool 26 during laser welding. The thickness T of the additive layer 28 is preferably about the same as the diameter of the laser beam 22. Alternatively, if each blank 10a and 10b includes an additive layer 28, the thickness T of each additive layer 28 can be about half of the diameter of the laser beam 22. By coordinating the thickness T of the additive layer 28 with a diameter of laser beam 22, the risk of laser beam 22 impinging the AlSi coating 18 and distributing Al in weld pool 26 is reduced. As noted above, however, while complete absence of Al in weld pool 26 is ideal, it should be understood that some impingement of the AlSi coating 18 may still yield the desired thermal transformation of the weld during thermal-hardening.

As noted above, the types of laser used in both the laser welding process to join blank 10a and 10b, and the powder laser deposition process can be the same type of laser, or different. It should be understood, however, that laser 20 used in the laser welding process is separate and apart from the laser 30 used in the powder laser deposition process. In addition, one skilled in the art would readily acknowledge and appreciate that the parameters of each laser (i.e., power, focal length, laser beam diameter, and the like) can be adjusted or tailored for each specific process.

After forming additive layer 28 on at least one of the blanks 10a and 10b, blanks 10a and 10b are abutted together and laser welded using laser 20. It should be understood that during the laser welding process, the welding of blanks 10a and 10b can be accomplished by application of laser welding alone, or also include concurrent introduction of a weld wire 38 into the weld pool 26. Use of a weld wire 38 is frequently employed in welding of tailored blanks to mitigate gaps (due to manufacturing variation) by acting as a filler between the abutting blanks 10a and 10b. Use of weld wire 38 may be desirable in the process of the present disclosure because application of additive layer 28 on side surfaces 16a and 16b may not mitigate the gaps between blanks 10a and 10b. If weld wire 38 is used, weld wire 38 may be formed of a material similar to, or different from, that which forms additive layer 28. If a weld filler wire 38 is used, the thickness T of additive layer 28 can be reduced.

After welding with or without weld wire 38, the welded blanks 10a and 10b can be thermal-hardened by placing the welded blanks 10a and 10b in an oven (not shown) to heat the welded blanks 10a and 10b, and then placing the heated welded blanks 10a and 10b in a forming die (not shown) that is cooled with internal plumbing. The cooled die closes on the heated blanks, which simultaneously shapes and quenches the welded blanks 10a and 10b in a single action. The hardened and shaped welded blanks 10a and 10b are then removed from the die and subjected to a trimming process to define the boundaries of a finished part made from the shaped welded blanks 10a and 10b.

Alternatively, the welded blanks 10a and 10b are inserted into a die while the welded blanks 10a and 10b are at about room temperature, and then the die closes on the welded blanks 10a and 10b, which shapes the welded blanks 10a and 10b. The shaped welded blanks 10a and 10b are then removed from the die, and trimmed to define the boundaries of a finished part made from the shaped welded blanks 10a and 10b. The finished part may then be thermal-hardened by placing the finished part in an oven to heat the finished part, and then quenching the finished part.

Yet another alternative is to heat the welded blanks 10a and 10b, and then quench the welded blanks 10a and 10b to thermal-harden the welded blanks 10a and 10b. The thermal-hardened welded blanks 10a and 10b may then be inserted into a die while the thermal-hardened welded blanks 10a and 10b are at about room temperature, and the die is closed to shape the thermal-hardened welded blanks 10a and 10b. The shaped welded blanks 10a and 10b may then be trimmed to define the boundaries of the finished part made from the welded blanks 10a and 10b.

It should be understood that additive processes other than the above-noted powder laser deposition process can be used without departing from the scope of the present disclosure. For example, the additive layer 28 can be applied to the side surface 16 of blanks 10a and/or 10b by 3D printing, chemical vapor deposition, physical vapor deposition, or lamination. In any of these processes, the important aspect that is required is to form the additive layer 28 on the blanks 10a and/or 10b that is devoid of the AlSi coating 18 so that when the blanks 10a and 10b are joined by laser welding or some other welding process, the Al and Si cannot be distributed in the weld pool 26 in quantities sufficient to impede desired thermal transformation of the weld.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method, comprising:
providing a first blank and a second blank each including an upper major surface, a lower major surface, and a plurality of side surfaces that connect the lower major surface to the upper major surface, the upper and lower major surfaces each including a coating that includes aluminum and that extends along the upper and lower major surfaces and terminates at an intersection between the upper major surface and the side surfaces and an intersection between the lower major surface and the side surfaces, and the side surfaces being devoid of the coating,
forming an additive layer on each of the first blank and the second blank on at least one of the side surfaces that is devoid of the coating;
after forming the additive layer on each of the first blank and the second blank, abutting the at least one side surface of the first blank including the additive layer to the at least one side surface of the second blank including the additive layer together; and
laser welding the additive layer of the first blank and the additive layer of the second blank to weld the first blank to the second blank,
wherein a combined thickness of the additive layers is the same as a diameter of a laser beam used during the laser welding such that during the laser welding, the laser beam only irradiates a material of the additive layers without irradiating the coatings located at the intersection between the upper major surface and the at least one side surface including the additive layer and the intersection between the lower major surface and the at least one side surface including the additive layer to form a weld pool that includes the material of the additive layers and does not include the aluminum of the coatings.

2. The method of claim 1, wherein the material of each of the first blank and the second blank is boron steel.

3. The method of claim 1, further comprising conducting a thermal-hardening process to the first and second blanks joined by the laser welding.

4. The method of claim 3, further comprising shaping the first blank and the second blank joined by the laser welding at the same time as the conducting the thermal-hardening process.

5. The method of claim 1, wherein the thickness of each of the additive layers is up to 3 mm.

6. The method of claim 1, wherein each of the additive layers are formed by powder laser deposition process.

7. The method of claim 6, wherein a powder used in the laser deposition process is formed of a material that is the same as a material that forms each of the first blank and the second blank.

8. The method of claim 6, wherein a powder used in the laser deposition process is formed of a material that is different from a material that forms each of the first blank and the second blank.

9. The method of claim 1, wherein the coating that includes aluminum is an AlSi alloy.

10. The method of claim 1, wherein a material of the first blank is the same as a material of the second blank.

11. The method of claim 1, wherein a thickness of the first blank is the same as a thickness of the second blank.

12. The method of claim 1, wherein a thickness of the first blank is different from a thickness of the second blank.

13. A method, comprising:
providing a first boron steel blank and a second boron steel blank that each include an upper major surface, a lower major surface, and a plurality of side surfaces that connect the lower major surface to the upper major surface, the upper and lower major surfaces each including a coating that includes aluminum and that extends along the upper and lower major surfaces and terminates at an intersection between the upper major surface and the side surfaces and an intersection between the lower major surface and the side surfaces, and the side surfaces being devoid of the coating,
forming an additive layer on at least one of the side surfaces of each of the first boron steel blank and the second boron steel blank that is devoid of the coating using a powder laser deposition process, the additive layers each being formed of a material that is the same or different from that of the first boron steel blank and the second boron steel blank;
after forming the additive layer on each of the first boron steel blank and the second boron steel blank, abutting the at least one side surface of the first boron steel blank including the additive layer to the at least one side surface of the second boron steel blank including the additive layer together;
laser welding the additive layer of the first boron steel blank and the additive layer of the second boron steel blank to weld the first boron steel blank to the second boron steel blank; and
thermal-hardening the welded first boron steel blank and the second boron steel blank;
wherein a combined thickness of the additive layers is the same as a diameter of a laser beam used during the laser welding such that during the laser welding, the laser beam only irradiates a material of the additive layers without irradiating the coatings located at the intersection between the upper major surface and the at least one side surface including the additive layer and the intersection between the lower major surface and the at least one side surface including the additive layer to form a weld pool that includes the material of the additive layers and does not include the aluminum of the coatings.

14. The method of claim 13, wherein a thickness of the first boron steel blank is the same as a thickness of the second boron steel blank.

15. The method of claim 13, wherein a thickness of the first boron steel blank is different from a thickness of the second boron steel blank.

16. The method of claim 13, further comprising shaping the first boron steel blank and the second boron steel blank joined by the laser welding at the same time as the thermal-hardening process.

* * * * *